United States Patent [19]
Shook

[11] 3,905,273
[45] Sept. 16, 1975

[54] MACHINE TOOL ASSEMBLY

[75] Inventor: Gerald Shook, Huntington Station, N.Y.

[73] Assignee: Shyodu Precision Instrument Company, Brooklyn, N.Y.

[22] Filed: July 22, 1974

[21] Appl. No.: 490,758

[52] U.S. Cl................ 90/11 R; 51/273; 144/251 R; 144/252; 408/56
[51] Int. Cl.².. B23C 1/06; B27G 3/00; B27G 21/00
[58] Field of Search............. 144/2 R, 251 A, 251 B, 144/251 R, 252 R; 51/273, 266; 408/56; 90/11 R

[56] References Cited
UNITED STATES PATENTS

| | | | |
|---|---|---|---|
| 2,611,402 | 9/1952 | Boice | 144/251 B |
| 3,082,802 | 3/1963 | Dickson et al. | 144/252 R X |
| 3,181,579 | 5/1965 | Kantor | 144/251 R |

FOREIGN PATENTS OR APPLICATIONS

| | | | |
|---|---|---|---|
| 1,412,723 | 8/1965 | France | 144/252 |
| 679,585 | 7/1939 | Germany | 144/252 |

Primary Examiner—Robert L. Spruill
Assistant Examiner—W. D. Bray
Attorney, Agent, or Firm—Edward H. Loveman, Esq.

[57] ABSTRACT

A machine tool assembly having means for the vacuum removal of dust and chips produced by the machine tool. The assembly comprises a housing having a table top with passageways within the underside thereof, which are in communication with a cooling fan of the machine tool to provide a vacuum in the passageway and thereby remove the chips and dust from the table top.

5 Claims, 8 Drawing Figures

MACHINE TOOL ASSEMBLY

The invention relates to vacuum systems for machine tools and more particularly relates to vacuum systems for machine tools wherein the machine tool provides the vacuum.

Vacuum systems for use with machine tools are well known. These systems generally employ a separate vacuum motor which is attached to the machine tool externally and, therefore, is cumbersome and requires constant adjustment for different operations. In addition, the external ducting is inefficient and extremely noisy.

According to the invention, there is provided a machine tool assembly having a housing with a top support table, for a machine tool, and which has passageways incorporated therein connected to the vacuum produced by the machine tool for removing dust and chips from the table top. The dust and chips pass through certain of these passageways and into the housing, where the body of the machine tool is stored. A filter surrounds the machine tool within the housing, and provides passage of filtered air to the atmosphere via other passageways incorporated in the table top. Sound absorbing material, tuned to the frequencies of the motor driving the machine tool, are employed in the passageways to reduce the noise to acceptable levels. A thermal protection device may be provided in the machine tool motor to indicate a clogged filter.

It is, therefore, a principal object of the present invention to provide a compact and efficient vacuum system for machine tools.

It is another object of the present invention, to provide a compact and efficient vacuum system for machine tools having means for reducing the level of noise produced by the air flow.

These and other objects and many of the attendant advantages of this invention will be readily appreciated as same becomes better understood by reference to the following detailed description when considered in connection with the accompanying drawings in which.

Figure 1:
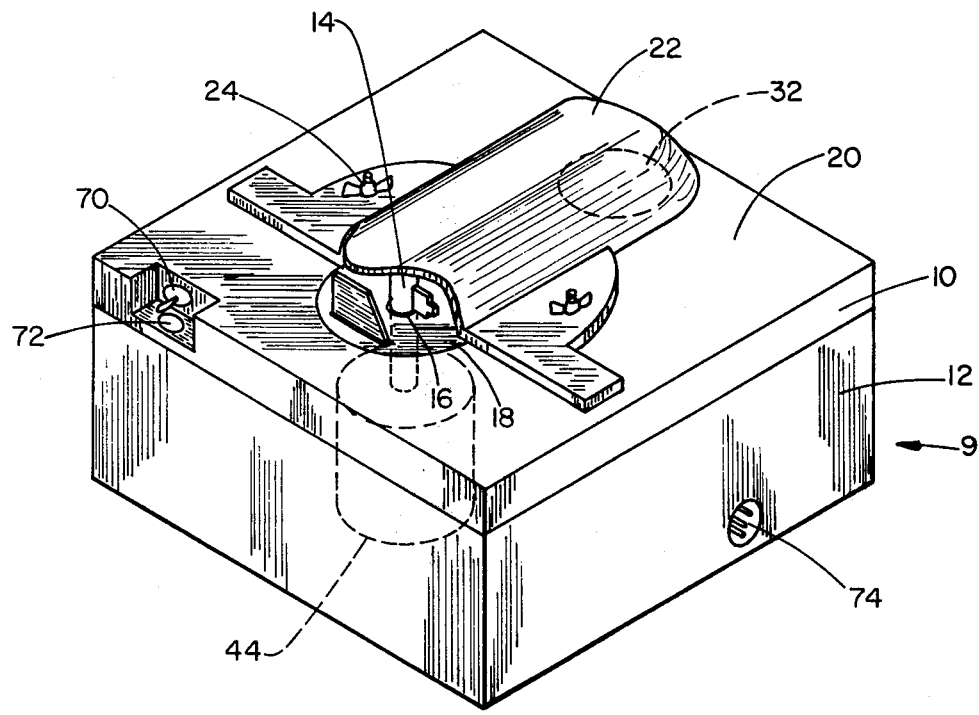
FIG. 1 is a perspective view of a machine tool assembly incorporating my invention.
Figure 2A:
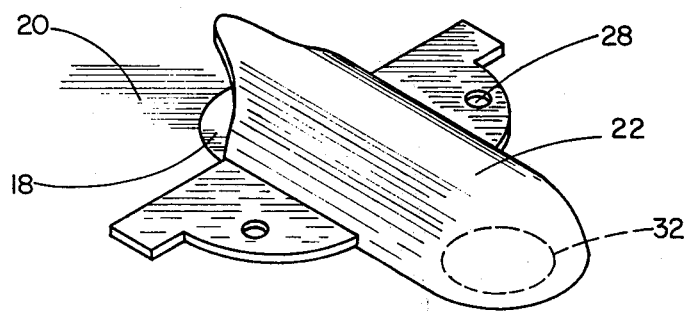
FIG. 2a is an enlarged view of the tool guard shown in FIG. 1.

Referring now to the drawings wherein like reference characters designate like or corresponding parts throughout, there is illustrated in FIG. 1, a machine tool assembly generally designated as reference numeral 9 comprising a housing 12 having a machine tool such as a router 44 for wood and soft metal pieces. A tool bit 14 in the router 44 is shown extending beyond a top surface 20 of a table top 10 through an aperture 16 of a removable cover 18. A hollow tool guard 22 shown in detail in FIG. 2a is fastened to the top surface 20 of the table top 10 by means of a plurality of fasteners 24, each secured to one of a plurality of studs 23. There are various types of tool guards available, the type being determined by the tool bit used as well as the operation desired. For example, as shown in FIGS. 2b and 2c, a safety guard 21 is provided for preventing accidental operator contact with the tool bit 14 as well as to prevent feeding the work piece in the wrong direction.

Figure 2B:
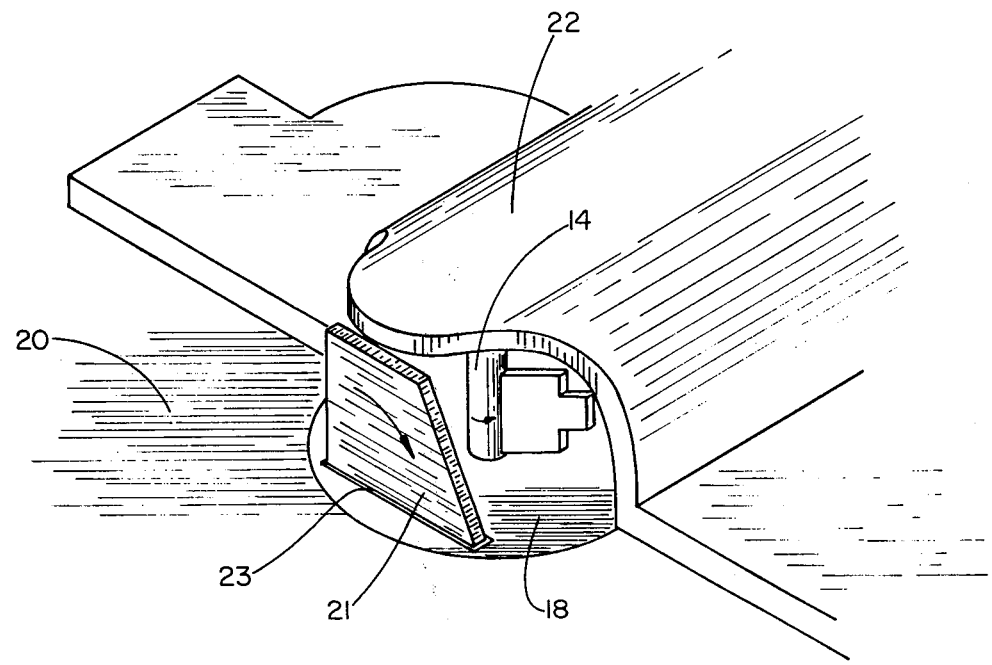
FIG. 2b is an enlarged view of a tool guard similar to that of FIG. 2a but which includes a safety guard.
Figure 2C:
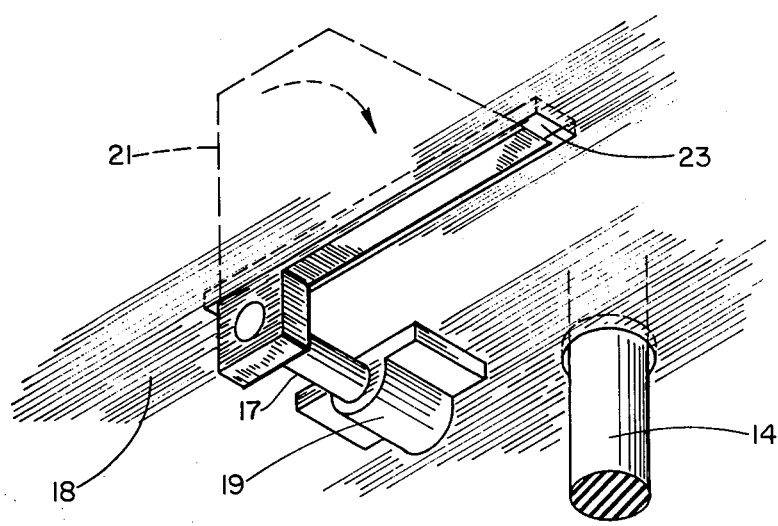
FIG. 2c is a view of the underside of the cover showing the safety guard assembly thereto.

The safety guard plate 21 is rigidly mounted to a shaft 17 which is journaled in a bearing 19 fastened to the underside of the cover 18 as illustrated in FIG. 2c. The shaft 17 is biased by a spring (not shown) so that the plate 21 normally protrudes through an aperture 23 in the cover 18.

The shaft 17 also includes a stop (not shown) which permits the plate 21 to be rotated from the position shown in FIG. 2b counterclockwise through the aperture by the pressure exerted by the work piece as it is moved from right to left (as shown by the arrow in FIG. 2b). After the work piece has passed over the cover 18, the plate 21 is rotated back to the position shown in FIG. 2b by the bias of the spring acting on the shaft 17. The tool guard 22 is hollow and covers an inlet port 32 (FIG. 3) whereby the surface 20 of the table top 10 and the hollow interior of the tool guard 22 form a passageway connecting the inlet port 32 to the tool bit 14.

Figure 3:
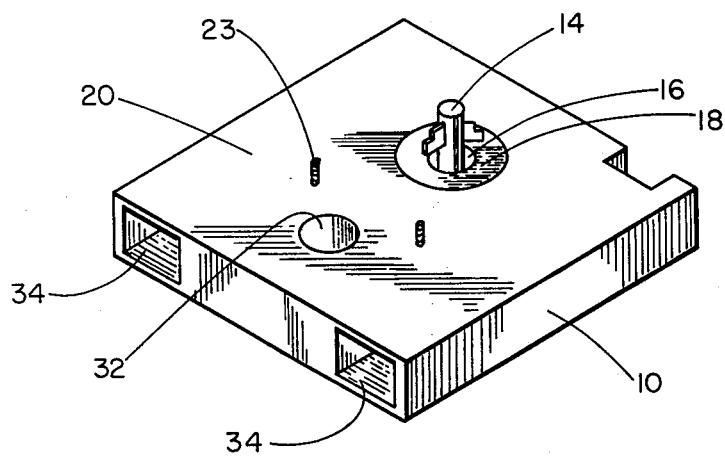
FIG. 3 is a right side view of the table top of the machine tool assembly of FIG. 1, with the tool guard removed.
Figure 4:
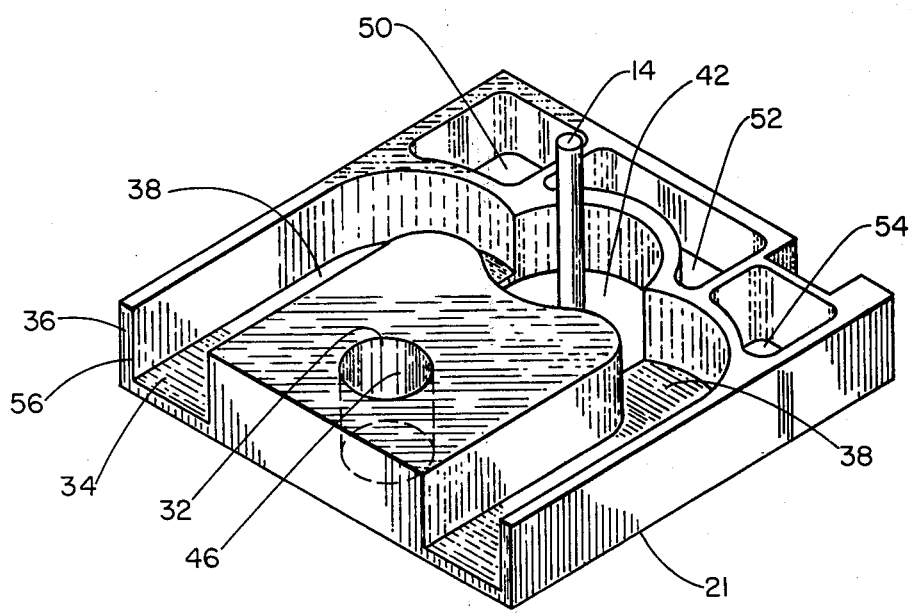
FIG. 4 is a cross-sectional view taken along line 4—4 of FIG. 3.

Referring now to FIGS. 3 and 4, it will be seen that the inlet port 32 extends entirely through the table top 10, which also includes a pair of outlet ports 34 connected via ducts 38 to a central aperture 42 wherein the cover 18 resides. Each of the ducts 38 is located near a remote edge 36 of the table top 10 in order to provide a longer sound level reducing path for noise frequencies transmitted by the air passing therethrough. The ducts 38 and 40 may be insulated with sound absorbing material 56 to reduce the noise level. In a similar fashion, the hollow interior of the tool guard 22 and the inlet port 32 may also be lined with the sound absorbing material 56. Apertures 50, 52 and 54 may be provided as an access to the interior of the housing 12 for electrical wiring as well as reducing the weight of the table top 10.

Figure 5:
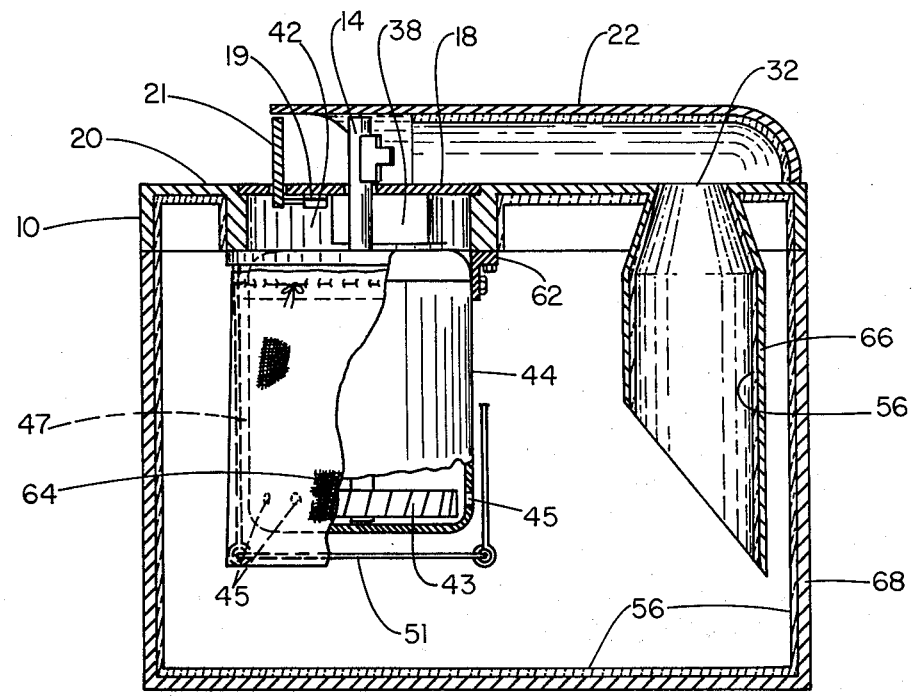
FIG. 5 is a vertical cross-sectional view taken along line 5—5 of FIG. 1.

The inlet port 32 in the table top 10 is connected to the interior of a lower shell 68 of the housing 12 via a tube 66 as clearly illustrated in FIG. 5. The router 44 is fastened via its flange 62 to the underside of the table top 10 by mounting screws (not shown) such that the tool bit 14 protrudes centrally through the aperture 42. As conventional in machine tools, the router 44 includes a cooling fan 43 which is adapted to draw air through a plurality of holes 45 in a motor housing 47 of the rotor 44 and discharge the air axially through the motor structure (between the stator and the rotor of the router 44). A filter 64 which may be comprised of woven cloth or a paper bag, etc., surrounds the motor housing 47 of the router 44 and is removably mounted on a frame 51 which is then mounted on the underside of the table top 10. The interior of the shell 68 as well as the interior of the tube 66 may be covered with the sound absorbing material 56.

Figure 6:
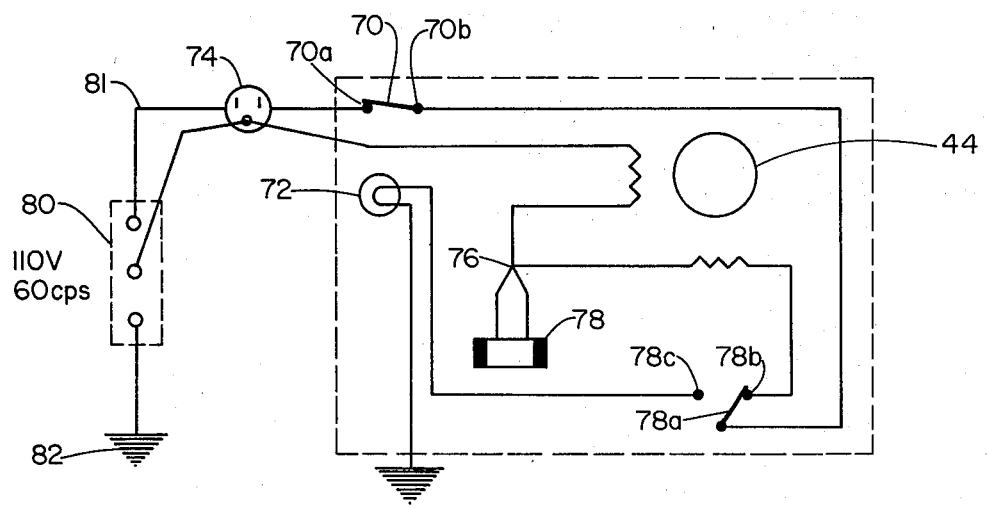
FIG. 6 is an electrical circuit diagram for the machine tool assembly illustrated in FIG. 1.

Referring now to FIG. 6, there is illustrated an electrical circuit diagram for operating the router 44 and which includes a conventional single pole double throw switch 70 having one terminal 70a connected to a source of power 80 via a plug 74 by a lead 81. The second terminal 70b of the switch 70 may be connected to the stator 79 of the router motor 44 via a normally closed relay 78 having a switch pole 78a and a normally closed terminal 78b. The relay 78 is controlled by a thermal detector 76 which may be electrically connected to the stator as shown. An indicating light 72 has one of its leads connected to a normally opened contact 78b of the relay 78. The other lead from the indicating light 72 is connected to a ground 82.

In operation, when the switch 70 is closed so that the terminal 70a is connected to the terminal 70b, electrical energy is supplied to the stator of the router 44 thereby rotating tool bit 14 and the fan 43. Rotation of the fan 43 provides a vacuum from the tool bit 14 through the hollow tool guard 18, the port 32, the tube 66 and through the filter 64. Thus, the dust and chips resulting from operation of the tool bit 14 against the work piece are deposited in the interior of the shell 68 and clean cooling air passes through the holes 45 axially through the router 44 to cool the motor structure and is then discharged through the aperture 42 through the ducts 38, and out of the outlet ports 34. The noise, caused by the router and the air traveling through the aforementioned tubes and ducts is dampened by the sound absorbing material 56 whereby the level of the noise is substantially reduced. When the filter 64 becomes clogged, insufficient cooling air will be passed axially through the router 44 thereby causing the temperature of the stator of the router 44 to increase which increased temperature is sensed by the sensor 76 and energizes the relay 78 so that the relay pole 78a contacts the terminal 78c whereby the stator of the router 44 is de-energized to stop the router 44 and the indicator light 72 is actuated visually informing the operator of the clogged filter condition.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. In a machine tool assembly of the type having a machine tool with a motor housing for enclosing a stator surrounding a rotor which is mounted on a shaft and a fan also mounted on said shaft to provide a flow of cooling air for said rotor and said stator from a plurality of cooling air holes in said motor housing whereby said flow of cooling air is discharged axially between said rotor and said stator and through one end of said motor housing, one end of said shaft having a tool attached to said shaft and protruding through said one end of said motor housing, the improvement comprising:

a housing having a table top with a first aperture therethrough and a lower shell, said table top having means for mounting said motor housing on the underside thereof so that said motor housing extends into said shell and said protruding tool extends through said first aperture;

filtering means attached to the underside of said table top and enclosing said motor housing;

a second aperture through said table top and spaced from said first aperture;

a hollow tool guide mounted on the top surface of said table top and having one end positioned over said second aperture and another end justaposed to said first aperture to provide communication thereinbetween, said table top having passageways therein for communicating with said first aperture and one exterior end of said table top;

tube means connected to said second aperture on the underside of said table top and extending into said shell whereby rotation of said rotor will cause cooling air to be drawn by said fan through said hollow tool guide and said tube means, into the interior of said shell whereby filtered cooling air passes through said filtering means axially through said motor housing and through said first aperture into said passageways where it is discharged through said exterior end of said table top.

2. In a machine tool assembly as recited in claim 1 wherein said passageways in said table top comprise two passages which emanate at spaced positions of said first aperture and terminate at spaced positions at said end of said table top.

3. In a machine tool assembly as recited in claim 2 wherein said passageways have interior surfaces thereof covered with a sound absorbing material.

4. In a machine tool assembly as recited in claim 1 further including a covered means for enclosing said first aperture and having a central hole therethrough for said tool to protrude therethrough.

5. In a machine tool assembly as recited in claim 4 said cover having a safety guard means attached to the underside thereof for preventing contact with said tool and permitting work to be spaced against said tool from only one direction.

* * * * *